United States Patent
Matsumoto et al.

(10) Patent No.: US 11,776,752 B2
(45) Date of Patent: Oct. 3, 2023

(54) MULTILAYER CERAMIC CAPACITOR AND DIELECTRIC MATERIAL

(71) Applicant: TAIYO YUDEN CO., LTD., Tokyo (JP)

(72) Inventors: Yasuhiro Matsumoto, Takasaki (JP); Koichiro Morita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 385 days.

(21) Appl. No.: 17/317,608

(22) Filed: May 11, 2021

(65) Prior Publication Data
US 2021/0383973 A1  Dec. 9, 2021

(30) Foreign Application Priority Data
Jun. 5, 2020  (JP) .................................. 2020-098213

(51) Int. Cl.
*H01G 4/12* (2006.01)
*C04B 35/468* (2006.01)
(Continued)

(52) U.S. Cl.
CPC ....... *H01G 4/1245* (2013.01); *C04B 35/4682* (2013.01); *C04B 35/6261* (2013.01);
(Continued)

(58) Field of Classification Search
CPC ...... H01G 4/1245; H01G 4/30; H01G 4/1236; H01G 4/1227; H01G 4/1209; H01G 4/35; H01G 4/012; C04B 35/4682; C04B 35/6261; C04B 35/6342; C04B 35/64; C04B 2235/3224; C04B 2235/3236; C04B 2235/3244; C04B 2235/442;
(Continued)

(56) References Cited

U.S. PATENT DOCUMENTS 5,432,136 A * 7/1995 Shibata ............... C04B 35/4684
                                                             501/138
5,818,686 A * 10/1998 Mizuno ................ H01G 4/1209
                                                             361/321.4
(Continued)

FOREIGN PATENT DOCUMENTS

CN    102442824 B  *  7/2013  .......... C04B 35/4682
CN    114765097 A  *  7/2022  ........... H01G 4/1227
(Continued)

*Primary Examiner* — Dion R. Ferguson
(74) *Attorney, Agent, or Firm* — Law Office of Katsuhiro Arai (57) ABSTRACT

A multilayer ceramic capacitor includes a multilayer structure having a substantially rectangular parallelepiped shape and including dielectric layers and internal electrode layers that are alternately stacked, the dielectric layers being mainly composed of $BaTiO_3$, the internal electrode layers being alternately exposed to two edge faces of the multilayer chip opposite to each other. A Zr/Ti ratio is 0.02 or more and 0.10 or less in a capacity section. A Ba/Ti ratio is more than 0.900 and less than 1.010 in the capacity section. A Eu/Ti ratio is 0.005 or more and 0.05 or less in the capacity section. A Mn/Ti ratio is 0.0005 or more and 0.05 or less in the capacity section. A total amount of a rare earth element or rare earth elements is less than the amount of Eu.

18 Claims, 6 Drawing Sheets

(51) Int. Cl.
*H01G 4/30* (2006.01)
*C04B 35/626* (2006.01)
*C04B 35/634* (2006.01)
*C04B 35/64* (2006.01)

(52) U.S. Cl.
CPC .......... *C04B 35/6342* (2013.01); *C04B 35/64* (2013.01); *H01G 4/30* (2013.01); *C04B 2235/3224* (2013.01); *C04B 2235/3236* (2013.01); *C04B 2235/3244* (2013.01); *C04B 2235/442* (2013.01); *C04B 2235/5454* (2013.01); *C04B 2235/6025* (2013.01); *C04B 2235/6562* (2013.01); *C04B 2235/6567* (2013.01)

(58) Field of Classification Search
CPC .... C04B 2235/5454; C04B 2235/6025; C04B 2235/6562; C04B 2235/6567; C04B 2235/3215; C04B 2235/3262; C04B 2235/6584; C04B 35/49; C04B 2235/79; C04B 35/62815; C04B 35/62821; C04B 35/62823; C04B 2235/768; C04B 2237/348; C04B 2235/663; C04B 2237/346; B32B 18/00

See application file for complete search history.

(56) References Cited

U.S. PATENT DOCUMENTS

| | | | |
|---|---|---|---|
| 6,043,974 A | * | 3/2000 | Chen ........................ C04B 35/49 361/321.2 |
| 6,606,238 B1 | * | 8/2003 | Nakamura ................ H01G 4/30 361/321.5 |
| 2021/0383973 A1 | * | 12/2021 | Matsumoto ......... C04B 35/6342 |

FOREIGN PATENT DOCUMENTS

| | | | | | |
|---|---|---|---|---|---|
| JP | 2009035431 A | * | 2/2009 | ........... | H01G 4/1227 |
| JP | 2013197492 A | | 9/2013 | | |
| JP | 2013227196 A | * | 11/2013 | | |
| WO | WO-2005090260 A1 | * | 9/2005 | ............ | B32B 18/00 |
| WO | WO2006003753 A1 | * | 4/2008 | | |

* cited by examiner

MULTILAYER CERAMIC CAPACITOR AND DIELECTRIC MATERIAL

CROSS-REFERENCE TO RELATED APPLICATION

This application is based upon and claims the benefit of priority of the prior Japanese Patent Application No. 2020-098213, filed on Jun. 5, 2020, the entire contents of which are incorporated herein by reference.

FIELD

A certain aspect of the present disclosure relates to a multilayer ceramic capacitor and a dielectric material.

BACKGROUND

In high frequency communication systems such as mobile phones, ceramic electronic devices such as multilayer ceramic capacitors are being used in order to remove noise (for example, see Japanese Patent Application Publication No. 2013-197492).

SUMMARY OF THE INVENTION

According to a first aspect of the embodiments, there is provided a multilayer ceramic capacitor including: a multilayer structure having a substantially rectangular parallelepiped shape and including dielectric layers and internal electrode layers that are alternately stacked, the dielectric layers being mainly composed of $BaTiO_3$, the internal electrode layers being alternately exposed to two edge faces of the multilayer chip opposite to each other, wherein a Zr/Ti ratio that is a ratio of an amount of Zr with respect to an amount of Ti is 0.02 or more and 0.10 or less in a capacity section in which the internal electrode layers next to each other are exposed to different edge faces of the multilayer structure, wherein a Ba/Ti ratio that is a ratio of an amount of Ba with respect to the amount of Ti is more than 0.900 and less than 1.010 in the capacity section, wherein a Eu/Ti ratio that is a ratio of an amount of Eu with respect to the amount of Ti is 0.005 or more and 0.05 or less in the capacity section, wherein a Mn/Ti ratio that is a ratio of an amount of Mn with respect to the amount of Ti is 0.0005 or more and 0.05 or less in the capacity section, and wherein a total amount of a rare earth element or rare earth elements is less than the amount of Eu.

According to a second aspect of the embodiments, there is provided a dielectric material including: $BaTiO_3$ powder; and an additive compound, wherein a Zr/Ti ratio that is a ratio of an amount of Zr with respect to an amount of Ti is 0.02 or more and 0.10 or less, wherein a Ba/Ti ratio that is a ratio of an amount of Ba with respect to the amount of Ti is more than 0.900 and less than 1.010, wherein a Eu/Ti ratio that is a ratio of an amount of Eu with respect to the amount of Ti is 0.005 or more and 0.05 or less, wherein a Mn/Ti ratio that is a ratio of an amount of Mn with respect to the amount of Ti is 0.0005 or more and 0.05 or less, and wherein a total amount of a rare earth element or rare earth elements is less than the amount of Eu.

DETAILED DESCRIPTION

When the ceramic electronic device has a core-shell structure in which a core is made of a main component ceramic and a shell into which each additive is solid-solved surrounds the core, a dielectric substance having a high dielectric constant, excellent temperature characteristic and a stable micro structure is obtained. Mg (magnesium) is a representative example of an additive structuring the shell. However, Mg is a simple acceptor of which a valence is constant. Mg is solid solved into the dielectric substance. And an oxygen vacancy is generated. Therefore, reliability is not sufficiently improved.

Hereinafter, an exemplary embodiment will be described with reference to the accompanying drawings.

[Exemplary Embodiment]

Figure 1:
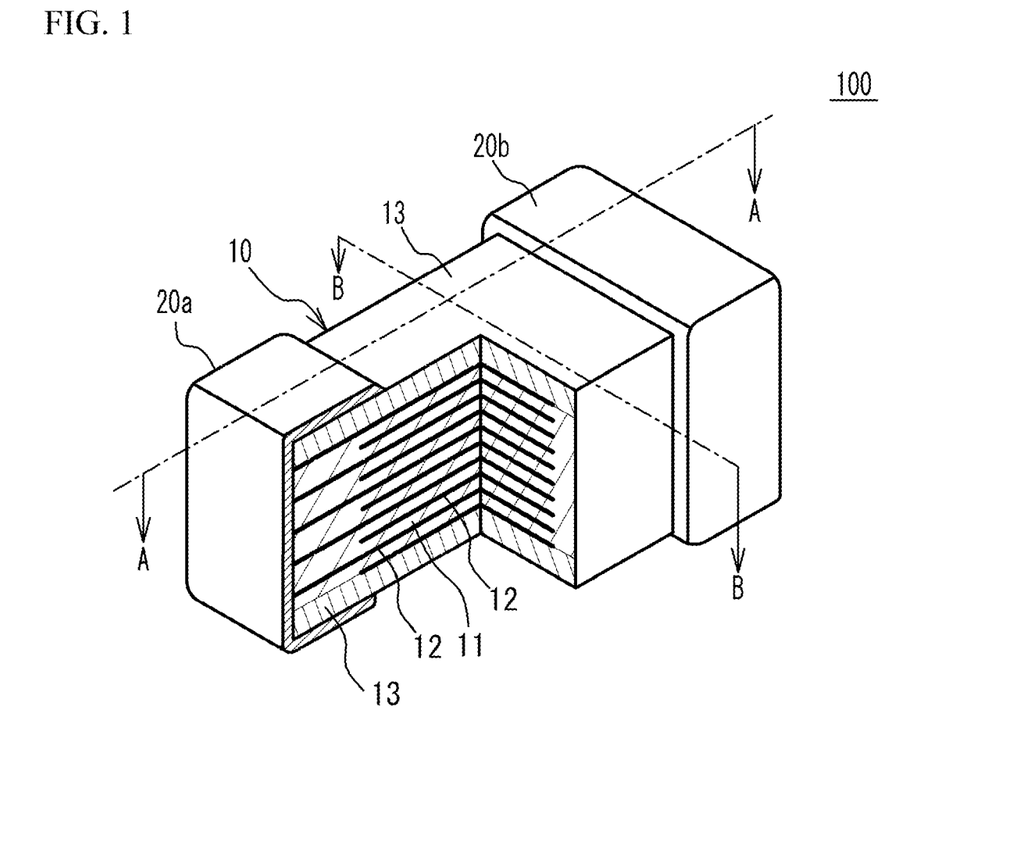
FIG. 1 is a partial cross-sectional perspective view of a multilayer ceramic capacitor.
Figure 2:
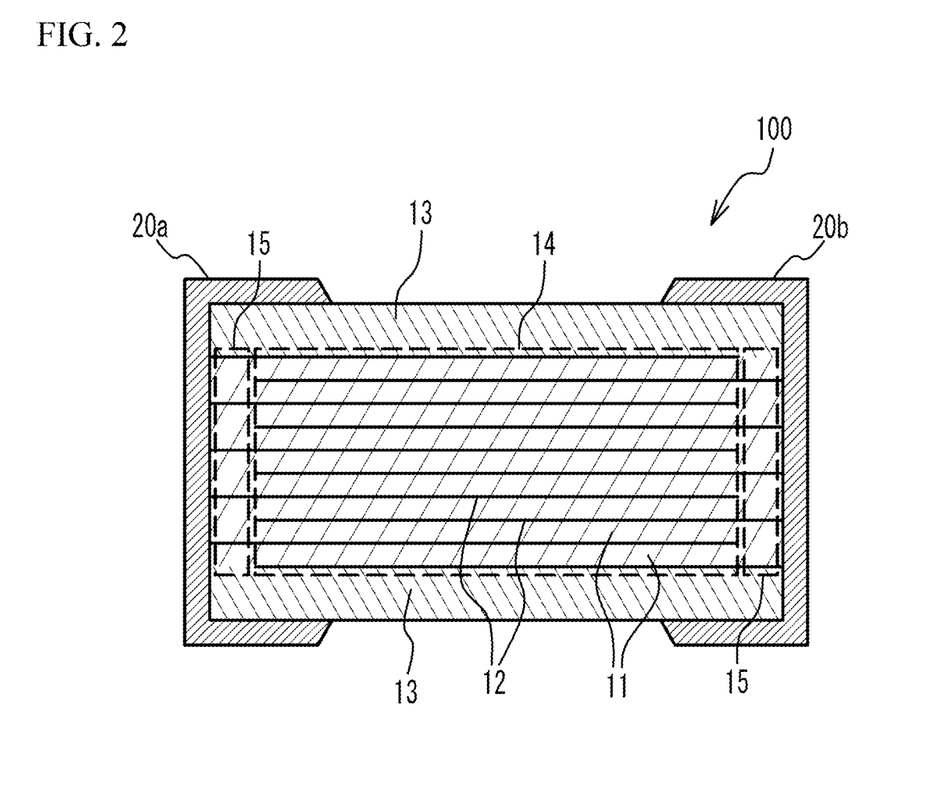
FIG. 2 is a cross-sectional view taken along line A-A in FIG. 1.
Figure 3:
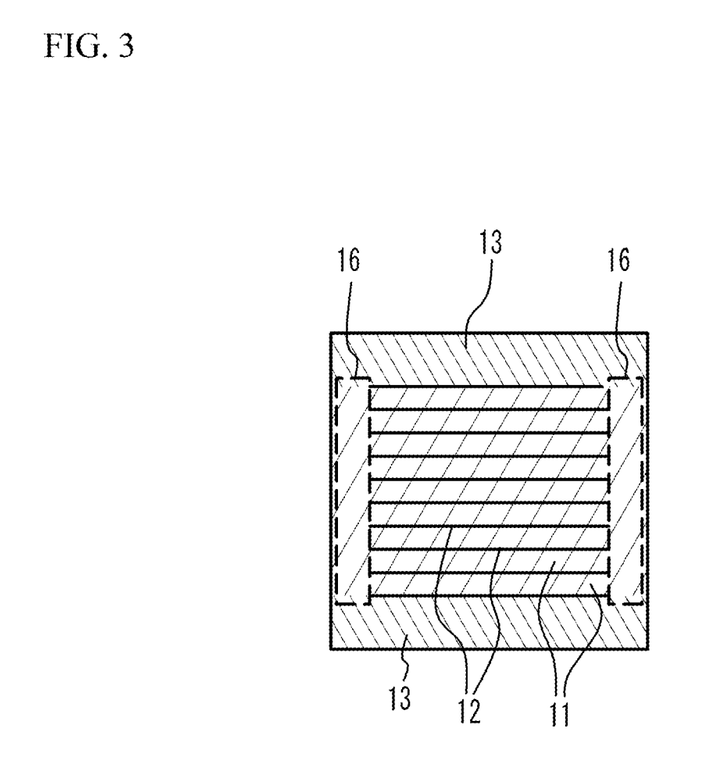
FIG. 3 is a cross-sectional view taken along line B-B in FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. End edges of the internal electrode layers 12 are alternately exposed to a first edge face of the multilayer chip 10 and a second edge face of the multilayer chip 10 that is different from the first edge face. The external electrode 20a is provided on the first edge face. The external electrode 20b is provided on the second edge face. Thus, the internal electrode layers 12 are alternately electrically connected to the external electrode 20a and the external electrode 20b. Accordingly, the multilayer ceramic capacitor 100 has a structure in which a plurality of the dielectric layers 11 is stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them.

The dielectric layer 11 is mainly composed of a ceramic material having a perovskite structure expressed by a general formula $ABO_3$. The perovskite structure includes $ABO_{3-\alpha}$ having an off-stoichiometric composition. In the embodiment $BaTiO_3$ (barium titanate) is used as the ceramic material. For example, the dielectric layers 11 are formed by firing a dielectric material including ceramic material powder of which a main component is a ceramic material having the perovskite structure.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

When at least a part of crystal grains of $BaTiO_3$ of the dielectric layers 11 in the capacity section 14 of the multilayer ceramic capacitor 100 has a core-shell structure, the dielectric layers 11 in the capacity section 14 have a high dielectric constant and excellent temperature characteristic. In this case, stable micro structures coexist.

For example, Mg acts as a representative additive structuring the shell. However, Mg is a simple acceptor of which a valence is constant. When Mg is solid-solved in $BaTiO_3$ of the dielectric layers 11, an oxygen vacancy is formed. Therefore, improvement of the reliability may be difficult.

And so, in the embodiment, at least a part of the crystal grains of $BaTiO_3$ of the dielectric layers in the capacity section 14 has a core-shell structure in which $BaTiO_3$ acts as a core and a layer to which Zr (zirconium) is diffused acts as a shell. A main component of the shell is $BaTiO_3$.

Figure 4A:
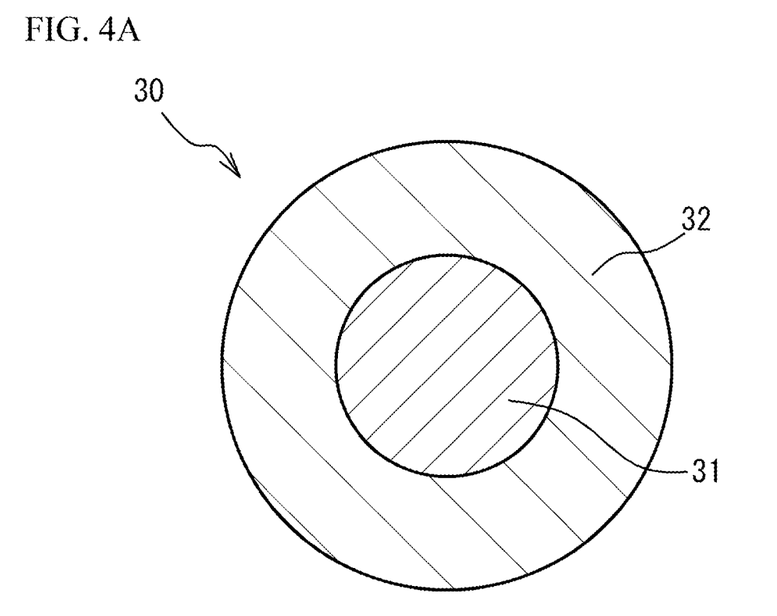
FIG. 4A schematically illustrates a core-shell grain.

As illustrated in FIG. 4A, a core-shell grain 30 has a core portion 31 having a spherical shape and a shell portion 32 covering and surrounding the core portion 31. The core portion 31 is a crystal portion in which no additive compound is solid-solved or an amount of solid-solved additive compound is small. The shell portion 32 is a crystal portion in which an additive compound is solid-solved. And a concentration of an additive compound of the shell portion 32 is higher than that of the core portion 31. In the embodiment, the concentration of Zr in the shell portion 32 is higher than that of the core portion 31. Alternatively, Zr is diffused into the shell portion 32, and Zr is not diffused into the core portion 31.

Figure 4B:
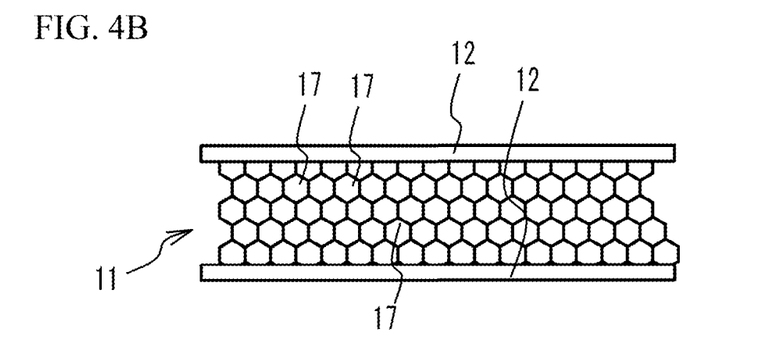
FIG. 4B schematically illustrates a cross section of a dielectric layer.

FIG. 4B schematically illustrates a cross section of the dielectric layer 11. As illustrated in FIG. 4B, the dielectric layer 11 includes a plurality of crystal grains 17 of the main component ceramic. At least a part of the crystal grains 17 is the core shell grain 30 described on the basis of FIG. 4A.

When the shell of which the main component is Zr having high resistance to reduction covers the core, the high dielectric constant is remained and a stable structure is achieved. And, a highly reliable material is obtained. However, when Zr is doped, a lattice constant of the $BaTiO_3$ crystal is enlarged and an amount of rare earth elements solid-solved in the B site is larger than that in the A site. In this case, an amount of acceptors is excessive. Therefore, the improvement of the lifetime characteristic is limited. The rare earth elements are such as Ho (holmium), Dy (dysprosium), Y (yttrium) or the like acting as an important role in life time characteristic.

And so, the present inventors have studied rare earth elements having a large ionic radius which are easily solid-solved into an A site of $BaTiO_3$. The present inventors have found that the lifetime of a case where Eu (europium) is added is more than the lifetime of a case where a rare earth element such as Ho, Dy or Y is added, by one digit or so. The reason why the lifetime is improved by adding Eu is not completely explained. Eu of which a valence is two and Eu of which the valence is three are stable. The valence of Eu fluctuates between two and three. The ionic radius of Eu of which the valence is two is the largest among stable rare earth ions. Therefore, Eu may tend to be solid-solved into the A site. However, when a part of Eu has a valence of three and is solid-solved in the A site, the Eu acts as a donner and may degrade the insulation characteristic. And so, Mn (manganese) reducing the number of excessive electrons is co-added. Mn can improve the insulation characteristic. When a re-oxidation process is performed, the valence of Mn increases. Thus, Mn reduces the number of the oxygen vacancies. And the lifetime increases more. Rare earth elements other than Eu are stable when the valence of the rare earth elements is three. The rare earth elements are unstable when the valence of the rare earth elements is two.

Table 1 shows ionic radiuses of rare earth elements of which a coordination number is 6. Exhibition of Table 1 is "R. D. Shannon, Acta Crystallogr., A32, 751(1976)".

TABLE 1

| | VALENCE | IONIC RADIUS(Å) | |
| --- | --- | --- | --- |
| | | COORDINATION NUMBER IS 6 | COORDINATION NUMBER IS 12 |
| Ba | +2 | | 1.610 |
| Ti | +4 | 0.605 | |
| Eu | +2 | 1.170 | |
| Dy | +2 | 1.070 | |
| La | +3 | 1.032 | |
| Tm | +2 | 1.030 | |
| Yb | +2 | 1.020 | |
| Ce | +3 | 1.010 | |
| Pr | +3 | 0.990 | |
| Nd | +3 | 0.983 | |
| Pm | +3 | 0.970 | |
| Sm | +3 | 0.958 | |
| Eu | +3 | 0.947 | |
| Gd | +3 | 0.938 | |
| Tb | +3 | 0.923 | |
| Dy | +3 | 0.912 | |
| Ho | +3 | 0.901 | |
| Y | +3 | 0.900 | |
| Er | +3 | 0.890 | |
| Tm | +3 | 0.880 | |
| Yb | +3 | 0.868 | |
| Lu | +3 | 0.861 | |
| Sc | +3 | 0.745 | |

Eu is solid-solved more easily into the shell portion 32 than into the core portion 31. Therefore, a concentration of Eu in the shell portion 32 is higher than that in the core portion 31. Alternatively, Eu is solid-solved in the shell portion 32, and Eu is not solid-solved in the core portion 31.

When a sufficient amount of Zr is not added to the dielectric layers in the capacity section 14, the above-mentioned core-shell structure cannot be remained during the firing process of the dielectric layers 11. In this case, a local abnormal grain growth may occur. A sufficient lifetime may not be necessarily achieved. And, the X5R property of EIA standard (the capacity changing rate within −55 degrees C. to 85 degrees C. from the standard capacity at 25 degrees C. is within ±15%) may not be necessarily achieved. And so, in the embodiment, a Zr/Ti ratio which is a ratio of the amount of Zr with respect to the amount of Ti has a lower limit. In concrete, the Zr/Ti ratio is 0.02 or more. It is preferable that the Zr/Ti ratio is 0.03 or more. It is more preferable that the Zr/Ti ratio is 0.04 or more.

On the other hand, when the amount of Zr in the dielectric layers 11 in the capacity section 14 is excessively large, the grain growth occurs during the firing of the dielectric layers 11 and sufficient lifetime may not be necessarily achieved. And so, in the embodiment, the Zr/Ti ratio has an upper limit. In concrete, the Zr/Ti ratio is 0.10 or less. It is preferable that the Zr/Ti ratio is 0.08 or less. It is more preferable that the Zr/Ti ratio is 0.06 or less.

Next, when a Ba/Ti ratio which is a ratio of the amount of Ba with respect to the amount of Ti is excessively large in the dielectric layers 11 in the capacity section 14, the grain growth may occur during the firing of the dielectric layers 11 and the sufficient lifetime may not be necessarily achieved. And so, in the embodiment, the Ba/Ti ratio has an upper limit. In concrete, the Ba/Ti ratio is less than 1.010. It is preferable that the Ba/Ti ratio is 1.005 or less. It is more preferable that the Ba/Ti ratio is 1.003 or less.

On the other hand, when the Ba/Ti ratio is excessively small in the dielectric layers 11 in the capacity section 14, the amount of Ti is relatively large and the effect of Zr gets smaller. Thus, the sufficient lifetime may not be necessarily achieved. And so, in the embodiment, the Ba/Ti ratio has a lower limit. In concrete, the Ba/Ti ratio is more than 0.900. It is preferable that the Ba/Ti ratio is 0.950 or more. It is more preferable that the Ba/Ti ratio is 1.000 or more.

When the relationship of $0.02 \leq Zr/Ti\ ratio \leq 0.10$ and the relationship of $0.900 < Ba/Ti\ ratio < 1.010$ are satisfied in the dielectric layers 11 in the capacity section 14, the core-shell structure in which $BaTiO_3$ is a core and $BaTi_xZr_{1-x}O_3$ is a shell is obtained. The core-shell structure is not a structure in which two grains of $BaTiO_3$ and $BaZrO_3$ are mixed.

Next, when the added amount of Eu in the dielectric layers 11 in the capacity section 14 is excessively small, sufficient lifetime may not be necessarily achieved. And so, in the embodiment, the added amount of Eu has a lower limit. In concrete, in the dielectric layers 11 in the capacity section 14, an Eu/Ti ratio indicating the ratio of the amount of Eu with respect to the amount of Ti is 0.005 or more. It is preferable that the Eu/Ti ratio is 0.0075 or more. It is still more preferable that the Eu/Ti ratio is 0.01 or more.

When the added amount of Eu in the dielectric layers 11 in the capacity section 14 is excessively large, the insulation characteristic may be degraded. And sufficient lifetime may not be necessarily achieved. And so, in the embodiment, the added amount of Eu has an upper limit. In concrete, in the dielectric layers 11 in the capacity section 14, the Eu/Ti ratio is 0.05 or less. It is preferable that the Eu/Ti ratio is 0.03 or less. It is more preferable that the Eu/Ti ratio is 0.02 or less.

Next, when the amount of a rare earth element other than Eu is excessively large in the dielectric layers 11 in the capacity section 14, the effect of Eu improving the lifetime may get smaller. And the sufficient lifetime may not be necessarily achieved. And so, in the embodiment, the amount of the rare earth element other than Eu has an upper limit. In concrete, the amount of the rare earth element other than Eu is smaller than the amount of Eu. When the number of the rare earth elements other than Eu is two or more, the total amount of the rare earth elements is smaller than the amount of Eu.

When the added amount of Mn in the dielectric layers 11 in the capacity section 14 is excessively small, the insulation characteristic may be degraded. And sufficient lifetime may not be necessarily achieved. And so, in the embodiment, the added amount of Mn has a lower limit. In concrete, in the dielectric layers 11 in the capacity section 14, a Mn/Ti ratio indicating a ratio of the amount of Mn with respect to the amount of Ti is 0.0005 or more. It is preferable that the Mn/Ti ratio is 0.001 or more. It is still more preferable that the Mn/Ti ratio is 0.0015 or more.

When the added amount of Mn in the dielectric layers 11 in the capacity section 14 is excessively large, many oxygen vacancies may be formed. And sufficient lifetime may not be necessarily achieved. And so, in the embodiment, the added amount of Mn has an upper limit. In concrete, in the dielectric layers 11 in the capacity section 14, the Mn/Ti ratio is 0.05 or less. It is preferable that the Mn/Ti ratio is 0.02 or less. It is still more preferable that the Mn/Ti ratio is 0.01 or less.

Figure 6:
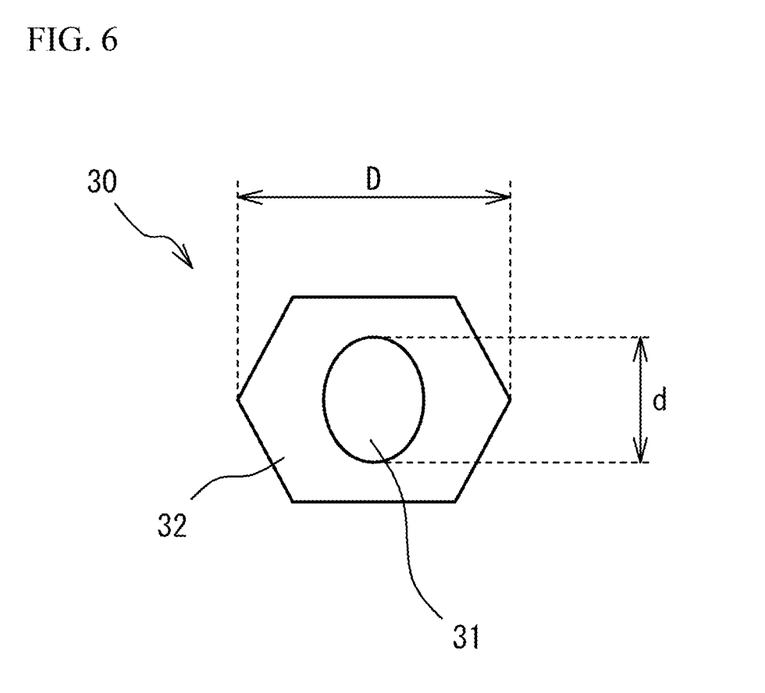
FIG. 6 illustrates a size of a core-shell structure.

When Zr is diffused into $BaTiO_3$ and solid-solved in $BaTiO_3$, Curie temperature of $BaTiO_3$ is reduced. Therefore, when the layer into which Zr is diffused is excessively thick, the capacity is largely reduced at a high temperature. And the X5R property may not be necessarily satisfied. In the core-shell structure, a long axis length of a grain diameter is referred to as "D" as illustrated in FIG. 6. A long axis length of a core diameter is referred to as "d" as illustrated in FIG. 6. When a d/D ratio which is a ratio of the long axis length of the core diameter with respect to the long axis length of the grain diameter is less than 0.3, the X5R property may not be necessarily achieved. It is therefore preferable that the d/D ratio is 0.3 or more. It is more preferable that the d/D ratio is 0.4 or more. It is still more preferable that the d/D ratio is 0.5 or more. On the other hand, when the d/D ratio is more than 0.9, the additive such as Zr or Eu is not sufficiently diffused and solid-solved in $BaTiO_3$. Therefore, the lifetime may be small. It is therefore preferable that the d/D ratio is 0.9 or less. It is more preferable that the d/D ratio is 0.8 or less. It is still more preferable that the d/D ratio is 0.7 or less. It is possible to measure "d" and "D" by using a TEM (Transmission Electron Microscope). It is possible to calculate "d" and "D" by calculating an average value of 20 numbers of dielectric grains which are randomly selected. When the core does not exist (a continuous solid solution), "d" is 0.

Figure 5:
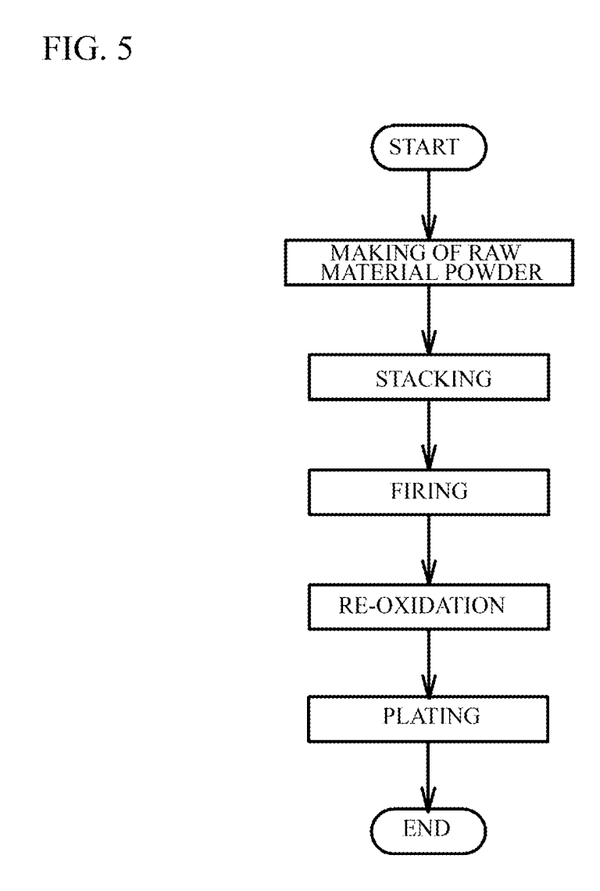
FIG. 5 is a flowchart of a method of manufacturing a multilayer ceramic capacitor.

Next, the manufacturing method of the multilayer ceramic capacitor 100 will be described. FIG. 5 is a flowchart of the manufacturing method of the multilayer ceramic capacitor 100.

[Making of Raw Material Powder (S1)]

A dielectric material for forming the dielectric layer 11 is prepared. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of Zr, Mg, V (vanadium), Cr (chromium) or Eu, or an oxide of cobalt (Co), Ni, lithium (Li), B (boron), sodium (Na), potassium (K) or Si (silicon), or glass. If necessary, an oxide of a rare earth element other than Eu. The rare earth element is such as Sc (scandium), Y, La (lanthanum), Ce (cerium), Pr (praseodymium), Nd (neodymium), Pm (promethium), Sm (samarium), Gd (gadolinium), Tb (terbium), Dy, Ho, Er (erbium), Tm (thulium), Yb (ytterbium), or Lu (lutetium).

For example, a compound including an additive is wet-blended with the resulting ceramic material powder. The resulting ceramic material powder is dried and crushed. For example, the resulting ceramic material is crushed if necessary. Thus, a particle diameter is adjusted. Alternatively, the particle diameter may be further adjusted by a classification process. Thus, a dielectric material is obtained.

In the dielectric material, the Zr/Ti ratio which is a ratio of the amount of Zr with respect to the amount of Ti is 0.02 or more and 0.10 or less. In the dielectric material, the Ba/Ti ratio which is a ratio of the amount of Ba with respect to the amount of Ti is more than 0.900 and less than 1.010. In the dielectric material, the Eu/Ti ratio which is a ratio of the amount of Eu with respect to the amount of Ti is 0.005 or more and 0.05 or less. In the dielectric material, the Mn/Ti ratio which is a ratio of the amount of Mn with respect to the amount of Ti is 0.0005 or more and 0.05 or less. In the dielectric material, a total amount of a rare earth element or rare earth elements other Eu is smaller than the amount of Eu.

[Stacking Process (S2)]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of, for example, 0.5 µm or more is painted on a base material by, for example, a die coater method or a doctor blade method, and then dried.

Next, an internal electrode layer pattern is formed on the surface of the dielectric green sheet by printing a metal conductive paste for forming the internal electrode with use of screen printing or gravure printing. The metal conductive paste for forming the internal electrode contains an organic binder. A plurality of internal electrode layer patterns are alternately exposed to a pair of external electrodes. Ceramic particles are added as a co-material to the metal conductive paste. The main component of the ceramic particles is not particularly limited, but is preferably the same as the main component ceramic of the dielectric layer 11. For example, $BaTiO_3$ of which an average grain diameter is 50 nm or less may be evenly dispersed.

After that, the dielectric green sheet on which the internal electrode layer pattern is printed is stamped into a predetermined size, and a predetermined number (for example, 100 to 1000) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets to be the cover layers 13 are clamped on the upper face and the lower face of the stacked dielectric green sheets in the stacking direction. And, the resulting multilayer structure is cut into a predetermined chip size (for example, 1.0 mm×0.5 mm). When an increasing speed of temperature in the firing process is 10 degree C./h or so, diffusion of Zr is excessively promoted. And a continuous solid solution grain may be formed. And so, in the embodiment, a rapid temperature rising of 6000 degrees C./h is performed. Thus, a diffusion distance of Zr is limited. And the core-shell structure can be formed.

[Firing Process (S3)]

The binder is removed from the resulting ceramic multilayer structure in $N_2$ atmosphere. After that, Ni paste to be the base layer of the external electrodes 20a and 20b is painted by a dipping method. The resulting ceramic multilayer structure is fired in a reducing atmosphere with an oxygen partial pressure of $10^{-12}$ to $10^{-9}$ atm in a temperature range of 1100° C. to 1300° C. for 10 minutes to 2 hours. Thus, the multilayer ceramic capacitor 100 is obtained.

[Re-oxidizing Process (S4)]

Thereafter, the re-oxidizing process is performed in a $N_2$ gas atmosphere in a temperature range of 600° C. to 1000° C.

[Plating Process (S5)]

After that, metal layers such as Cu, Ni, Sn or the like may be formed on the base layers of the external electrodes 20a and 20b by plating. With the processes, the multilayer ceramic capacitor 100 is fabricated.

In the manufacturing method of the embodiment, the core-shell grain 30 illustrated in FIG. 4A is formed in at least a part of the dielectric layers 11 in the capacity section 14. In the dielectric layers 11 in the capacity section 14, the Zr/Ti ratio which is a ratio of the amount of Zr with respect to the amount of Ti is 0.02 or more and 0.10 or less. In the dielectric layers 11 in the capacity section 14, the Ba/Ti ratio which is a ratio of the amount of Ba with respect to the amount of Ti is more than 0.900 and less than 1.010. In the dielectric layers 11 in the capacity section 14, the Eu/Ti ratio which is a ratio of the amount of Eu with respect to the amount of Ti is 0.005 or more and 0.05 or less. In the dielectric layers 11 in the capacity section 14, the Mn/Ti ratio which is a ratio of the amount of Mn with respect to the amount of Ti is 0.0005 or more and 0.05 or less. A total amount of a rare earth element or rare earth elements other than Eu is smaller than the amount of Eu. Therefore, the high dielectric constant and excellent temperature characteristic are remained, and high reliability is achieved in the multilayer ceramic capacitor 100.

EXAMPLES

The multilayer ceramic capacitors in accordance with the embodiment were made. And, property of the multilayer ceramic capacitors was measured.

(Example 1) Barium titanate powder of which an average particle diameter was 100 nm was prepared as the dielectric material. Additives such as $ZrO_2$, Eu oxide, $MnCO_3$ and so on were added to the barium titanate powder. The resulting barium titanate powder was mixed and crushed with use of zirconia bead having $\phi$ of 0.5 mm. Thus, the dielectric material was obtained. The Zr/Ti ratio was 0.02. The Ba/Ti ratio was 1.003. The Eu/Ti ratio was 0.01. The Mn/Ti ratio was 0.005.

An organic binder and a solvent were added to the resulting dielectric material. With use of the resulting slurry, dielectric green sheets were made by a doctor blade method. Polyvinyl butyral (PVB) or the like was used as the organic binder. Ethanol, toluene or the like was used as the solvent. And a plasticizer was added to the resulting dielectric material.

Next, metal conductive paste for forming internal electrode layers was made with use of a planetary ball mill. The metal conductive paste included the main component metal of the internal electrode layers 12, the co-material, a binder (ethyl cellulose), a solvent, and an additive when necessary.

The metal conductive paste for forming internal electrode layers was printed on each of the dielectric green sheets by a screen printing. 15 numbers of sheet members in which the metal conductive paste was printed on the dielectric green sheet were stacked. Cover sheets were stacked on the stacked green sheets and under the stacked green sheets. After that, a multilayer structure was obtained by a thermal crimping. The multilayer structure was cut into a predetermined shape.

The binder was removed from the resulting multilayer structure in $N_2$ atmosphere. After that, the metal conductive paste including a metal filler of which a main component is Ni, the co-material, the binder, the solvent and so on was painted from both edge faces of the multilayer structure to each side faces and was dried. The metal conductive paste for base layers and the multilayer structure were fired in a reducing atmosphere in a temperature range of 1100° C. to 1300° C. for 10 minutes to 2 hours, together with each other. Thus, a sintered structure was formed. The temperature rising speed was 6000° C./h. The length, the width and the height of the sintered structure were 0.6 mm, 0.3 mm and 0.3 mm. After that, the re-oxidation process was performed. After that, a Cu-plated layer, a Ni-plated layer and a Sn-plated layer were formed on a surface of the base layers by a plating method. Thus, the multilayer ceramic capacitors 100 were fabricated. The average thickness of the dielectric layers 11 was 2.0 μm.

(Example 2) In an example 2, the Zr/Ti ratio of the dielectric material was 0.04. The Ba/Ti ratio of the dielectric material was 1.003. The Eu/Ti ratio of the dielectric material was 0.005. The Mn/Ti ratio of the dielectric material was 0.005. Other conditions were the same as those of the example 1.

(Example 3) In an example 3, the Zr/Ti ratio of the dielectric material was 0.04. The Ba/Ti ratio of the dielectric material was 1.003. The Eu/Ti ratio of the dielectric material was 0.01. The Mn/Ti ratio of the dielectric material was 0.005. Other conditions were the same as those of the example 1.

(Example 4) In an example 4, the Zr/Ti ratio of the dielectric material was 0.04. The Ba/Ti ratio of the dielectric material was 1.003. The Eu/Ti ratio of the dielectric material was 0.015. The Mn/Ti ratio of the dielectric material was 0.005. Other conditions were the same as those of the example 1.

(Example 5) In an example 5, the Zr/Ti ratio of the dielectric material was 0.04. The Ba/Ti ratio of the dielectric material was 1.003. The Eu/Ti ratio of the dielectric material was 0.02. The Mn/Ti ratio of the dielectric material was 0.005. Other conditions were the same as those of the example 1.

(Example 6) In an example 6, the Zr/Ti ratio of the dielectric material was 0.04. The Ba/Ti ratio of the dielectric material was 1.003. The Eu/Ti ratio of the dielectric material was 0.03. The Mn/Ti ratio of the dielectric material was 0.005. Other conditions were the same as those of the example 1.

(Example 7) In an example 7, the Zr/Ti ratio of the dielectric material was 0.04. The Ba/Ti ratio of the dielectric material was 1.003. The Eu/Ti ratio of the dielectric material was 0.05. The Mn/Ti ratio of the dielectric material was 0.005. Other conditions were the same as those of the example 1.

(Example 8) In an example 8, the Zr/Ti ratio of the dielectric material was 0.04. The Ba/Ti ratio of the dielectric material was 1.003. The Eu/Ti ratio of the dielectric material was 0.01. The Mn/Ti ratio of the dielectric material was 0.005. $Ho_2O_3$ was added to the dielectric material. A Ho/Ti ratio which was a ratio of the amount of Ho with respect to the amount of Ti was 0.005. Other conditions were the same as those of the example 1.

(Example 9) In an example 9, the Zr/Ti ratio of the dielectric material was 0.04. The Ba/Ti ratio of the dielectric material was 1.003. The Eu/Ti ratio of the dielectric material was 0.01. The Mn/Ti ratio of the dielectric material was 0.0005. Other conditions were the same as those of the example 1.

(Example 10) In an example 10, the Zr/Ti ratio of the dielectric material was 0.04. The Ba/Ti ratio of the dielectric material was 1.003. The Eu/Ti ratio of the dielectric material was 0.01. The Mn/Ti ratio of the dielectric material was 0.02. Other conditions were the same as those of the example 1.

(Example 11) In an example 11, the Zr/Ti ratio of the dielectric material was 0.04. The Ba/Ti ratio of the dielectric material was 1.003. The Eu/Ti ratio of the dielectric material was 0.01. The Mn/Ti ratio of the dielectric material was 0.05. Other conditions were the same as those of the example 1.

(Example 12) In an example 12, the Zr/Ti ratio of the dielectric material was 0.06. The Ba/Ti ratio of the dielectric material was 1.003. The Eu/Ti ratio of the dielectric material was 0.01. The Mn/Ti ratio of the dielectric material was 0.005. Other conditions were the same as those of the example 1.

(Example 13) In an example 13, the Zr/Ti ratio of the dielectric material was 0.10. The Ba/Ti ratio of the dielectric material was 1.003. The Eu/Ti ratio of the dielectric material was 0.01. The Mn/Ti ratio of the dielectric material was 0.005. Other conditions were the same as those of the example 1.

(Comparative example 1) In a comparative example 1, the Zr/Ti ratio of the dielectric material was 0.01. The Ba/Ti ratio of the dielectric material was 1.003. The Eu/Ti ratio of the dielectric material was 0.01. The Mn/Ti ratio of the dielectric material was 0.005. Other conditions were the same as those of the example 1.

(Comparative example 2) In a comparative example 2, the Zr/Ti ratio of the dielectric material was 0.02. The Ba/Ti ratio of the dielectric material was 1.003. The Eu oxide was not added. $Y_2O_3$ was added to the dielectric material. A Y/Ti ratio which is the ratio of the amount of Y with respect to the amount of Ti was 0.01. The Mn/Ti ratio of the dielectric material was 0.005. Other conditions were the same as those of the example 1.

(Comparative example 3) In a comparative example 3, the Zr/Ti ratio of the dielectric material was 0.02. The Ba/Ti ratio of the dielectric material was 1.003. The Eu oxide was not added. $Ho_2O_3$ was added to the dielectric material. A Ho/Ti ratio which ss the ratio of the amount of Ho with respect to the amount of Ti was 0.01. The Mn/Ti ratio of the dielectric material was 0.005. Other conditions were the same as those of the example 1.

(Comparative example 4) In a comparative example 4, the Zr/Ti ratio of the dielectric material was 0.02. The Ba/Ti ratio of the dielectric material was 1.003. The Eu oxide was not added. $Dy_2O_3$ was added to the dielectric material. A Dy/Ti ratio which ss a ratio of the amount of Dy with respect to the amount of Ti was 0.01. The Mn/Ti ratio of the dielectric material was 0.005. Other conditions were the same as those of the example 1.

(Comparative example 5) In a comparative example 5, the Zr/Ti ratio of the dielectric material was 0.02. The Ba/Ti ratio of the dielectric material was 1.003. The Eu oxide was not added. $Tb_4O_7$ was added to the dielectric material. A Tb/Ti ratio which is a ratio of the amount of Tb with respect to the amount of Ti was 0.01. The Mn/Ti ratio of the dielectric material was 0.005. Other conditions were the same as those of the example 1.

(Comparative example 6) In a comparative example 6, the Zr/Ti ratio of the dielectric material was 0.02. The Ba/Ti ratio of the dielectric material was 1.003. The Eu oxide was not added. $Gd_2O_3$ was added to the dielectric material. A Gd/Ti ratio which is a ratio of the amount of Gd with respect to the amount of Ti was 0.01. The Mn/Ti ratio of the dielectric material was 0.005. Other conditions were the same as those of the example 1.

(Comparative example 7) In a comparative example 7, the Zr/Ti ratio of the dielectric material was 0.02. The Ba/Ti ratio of the dielectric material was 1.003. The Eu oxide was not added. $Nd_2O_3$ was added to the dielectric material. A Nd/Ti ratio which is a ratio of the amount of Nd with respect to the amount of Ti was 0.01. The Mn/Ti ratio of the dielectric material was 0.005. Other conditions were the same as those of the example 1.

(Comparative example 8) In a comparative example 8, the Zr/Ti ratio of the dielectric material was 0.02. The Ba/Ti ratio of the dielectric material was 1.003. The Eu oxide was not added. $Pr_6O_{11}$ was added to the dielectric material. A Pr/Ti ratio which is a ratio of the amount of Pr with respect to the amount of Ti was 0.01. The Mn/Ti ratio of the dielectric material was 0.005. Other conditions were the same as those of the example 1.

(Comparative example 9) In a comparative example 9, the Zr/Ti ratio of the dielectric material was 0.02. The Ba/Ti ratio of the dielectric material was 1.003. The Eu oxide was not added. CeO was added to the dielectric material. A Ce/Ti ratio which is a ratio of the amount of Ce with respect to the amount of Ti was 0.01. The Mn/Ti ratio of the dielectric material was 0.005. Other conditions were the same as those of the example 1.

(Comparative example 10) In a comparative example 10, the Zr/Ti ratio of the dielectric material was 0.02. The Ba/Ti ratio of the dielectric material was 1.003. The Eu oxide was not added. $La_2O_3$ was added to the dielectric material. A La/Ti ratio which is a ratio of the amount of La with respect to the amount of Ti was 0.01. The Mn/Ti ratio of the dielectric material was 0.005. Other conditions were the same as those of the example 1.

(Comparative example 11) In a comparative example 11, the Zr/Ti ratio of the dielectric material was 0.02. The Ba/Ti ratio of the dielectric material was 1.010. The Eu/Ti ratio of the dielectric material was 0.01. The Mn/Ti ratio of the dielectric material was 0.005. Other conditions were the same as those of the example 1.

(Comparative example 12) In a comparative example 12, the Zr/Ti ratio of the dielectric material was 0.02. The Ba/Ti ratio of the dielectric material was 0.900. The Eu/Ti ratio of the dielectric material was 0.01. The Mn/Ti ratio of the dielectric material was 0.005. Other conditions were the same as those of the example 1.

(Comparative example 13) In a comparative example 13, the Zr/Ti ratio of the dielectric material was 0.04. The Ba/Ti ratio of the dielectric material was 1.003. The Eu/Ti ratio of the dielectric material was 0.003. The Mn/Ti ratio of the dielectric material was 0.005. Other conditions were the same as those of the example 1.

(Comparative example 14) In a comparative example 14, the Zr/Ti ratio of the dielectric material was 0.04. The Ba/Ti ratio of the dielectric material was 1.003. The Eu/Ti ratio of the dielectric material was 0.07. The Mn/Ti ratio of the dielectric material was 0.005. Other conditions were the same as those of the example 1.

(Comparative example 15) In a comparative example 15, the Zr/Ti ratio of the dielectric material was 0.04. The Ba/Ti ratio of the dielectric material was 1.003. The Eu/Ti ratio of the dielectric material was 0.01. The Mn/Ti ratio of the dielectric material was 0.005. $Ho_2O_3$ was added. The Ho/Ti ratio which is a ratio of the amount of Ho with respect to the amount of Ti was 0.01. Other conditions were the same as those of the example 1.

(Comparative example 16) In a comparative example 16, the Zr/Ti ratio of the dielectric material was 0.04. The Ba/Ti ratio of the dielectric material was 1.003. The Eu/Ti ratio of the dielectric material was 0.01. $MnCO_3$ was not added. The Mn/Ti ratio of the dielectric material was 0.00. Other conditions were the same as those of the example 1.

(Comparative example 17) In a comparative example 17, the Zr/Ti ratio of the dielectric material was 0.04. The Ba/Ti ratio of the dielectric material was 1.003. The Eu/Ti ratio of the dielectric material was 0.01. The Mn/Ti ratio of the dielectric material was 0.07. Other conditions were the same as those of the example 1.

(Comparative example 18) In a comparative example 18, the Zr/Ti ratio of the dielectric material was 0.12. The Ba/Ti ratio of the dielectric material was 1.003. The Eu/Ti ratio of the dielectric material was 0.01. The Mn/Ti ratio of the dielectric material was 0.005. Other conditions were the same as those of the example 1.

(Analysis) With respect to each of the examples 1 to 13 and the comparative examples 1 to 18, the capacity was measured. And the dielectric constant of the dielectric layers from the lamination number, the intersection area, and the thickness of the dielectric layers. Each of the examples 1 to 13 and the comparative examples 1 to 18 was subjected to a HALT (Highly Accelerated Life Test) under a high-temperature and high-electrical-field condition of 125 degrees C. and 50 V/μm. The MTTF (Mean Time To Failure) was measured by measuring a period until a leak current exceeds a threshold (1 mA). And it is determined whether the examples 1 to 13 and the comparative examples 1 to 18 satisfied the X5R property. Table 2 and Table 3 show the results.

TABLE 2

|  | Zr/Ti | Ba/Ti | RARE EARTH/Ti |  | Mn/Ti | DIELECTRIC CONSTANT (ROOM TEMPERATURE) | HALT MTTF (min) | X5R | TOTAL DETERMINATION |
|---|---|---|---|---|---|---|---|---|---|
| EXAMPLE 1 | 0.02 | 1.003 | Eu | 0.01 | 0.005 | 3939 | 1280 | ○ | ○ |
| EXAMPLE 2 | 0.04 | 1.003 | Eu | 0.005 | 0.005 | 2420 | 1154 | ○ | ○ |
| EXAMPLE 3 | 0.04 | 1.003 | Eu | 0.01 | 0.005 | 2576 | 5600 | ○ | ○ |
| EXAMPLE 4 | 0.04 | 1.003 | Eu | 0.015 | 0.005 | 2703 | 5485 | ○ | ○ |
| EXAMPLE 5 | 0.04 | 1.003 | Eu | 0.02 | 0.005 | 2903 | 4411 | ○ | ○ |
| EXAMPLE 6 | 0.04 | 1.003 | Eu | 0.03 | 0.005 | 2987 | 3332 | ○ | ○ |
| EXAMPLE 7 | 0.04 | 1.003 | Eu | 0.05 | 0.005 | 3074 | 1374 | ○ | ○ |
| EXAMPLE 8 | 0.04 | 1.003 | Eu Ho | 0.01 0.005 | 0.005 | 2632 | 1283 | ○ | ○ |
| EXAMPLE 9 | 0.04 | 1.003 | Eu | 0.01 | 0.0005 | 2346 | 1068 | ○ | ○ |
| EXAMPLE 10 | 0.04 | 1.003 | Eu | 0.01 | 0.02 | 2253 | 8918 | ○ | ○ |
| EXAMPLE 11 | 0.04 | 1.003 | Eu | 0.01 | 0.05 | 2159 | 3479 | ○ | ○ |
| EXAMPLE 12 | 0.06 | 1.003 | Eu | 0.01 | 0.005 | 2064 | 4424 | ○ | ○ |
| EXAMPLE 13 | 0.10 | 1.003 | Eu | 0.01 | 0.005 | 1616 | 1213 | ○ | ○ |

TABLE 3

|  | Zr/Ti | Ba/Ti | RARE EARTH/Ti |  | Mn/Ti | DIELECTRIC CONSTANT (ROOM TEMPERATURE) | HALT MTTF (min) | X5R | TOTAL DETERMINATION |
|---|---|---|---|---|---|---|---|---|---|
| COMPARATIVE EXAMPLE 1 | 0.01 | 1.003 | Eu | 0.01 | 0.005 | 4291 | 0 | x | x |
| COMPARATIVE EXAMPLE 2 | 0.02 | 1.003 | Y | 0.01 | 0.005 | 3343 | 289 | ○ | x |
| COMPARATIVE EXAMPLE 3 | 0.02 | 1.003 | Ho | 0.01 | 0.005 | 3312 | 274 | ○ | x |
| COMPARATIVE EXAMPLE 4 | 0.02 | 1.003 | Dy | 0.01 | 0.005 | 3583 | 331 | ○ | x |
| COMPARATIVE EXAMPLE 5 | 0.02 | 1.003 | Tb | 0.01 | 0.005 | 3839 | 271 | ○ | x |
| COMPARATIVE EXAMPLE 6 | 0.02 | 1.003 | Gd | 0.01 | 0.005 | 4061 | 126 | ○ | x |
| COMPARATIVE EXAMPLE 7 | 0.02 | 1.003 | Nd | 0.01 | 0.005 | 3746 | 0 | ○ | x |
| COMPARATIVE EXAMPLE 8 | 0.02 | 1.003 | Pr | 0.01 | 0.005 | 3576 | 0 | ○ | x |
| COMPARATIVE EXAMPLE 9 | 0.02 | 1.003 | Ce | 0.01 | 0.005 | 3170 | 22 | ○ | x |
| COMPARATIVE EXAMPLE 10 | 0.02 | 1.003 | La | 0.01 | 0.005 | 2380 | 56 | ○ | x |
| COMPARATIVE EXAMPLE 11 | 0.02 | 1.010 | Eu | 0.01 | 0.005 | 3263 | 112 | ○ | x |
| COMPARATIVE EXAMPLE 12 | 0.02 | 0.900 | Eu | 0.01 | 0.005 | 1943 | 321 | ○ | x |
| COMPARATIVE EXAMPLE 13 | 0.04 | 1.003 | Eu | 0.003 | 0.005 | 2395 | 242 | ○ | x |
| COMPARATIVE EXAMPLE 14 | 0.04 | 1.003 | Eu | 0.07 | 0.005 | 3211 | 0 | ○ | x |
| COMPARATIVE EXAMPLE 15 | 0.04 | 1.003 | Eu Ho | 0.01 0.01 | 0.005 | 2580 | 39 | ○ | x x |
| COMPARATIVE EXAMPLE 16 | 0.04 | 1.003 | Eu | 0.01 | 0.00 | 2316 | 928 | ○ | x |
| COMPARATIVE EXAMPLE 17 | 0.04 | 1.003 | Eu | 0.01 | 0.07 | 1934 | 357 | x | x |
| COMPARATIVE EXAMPLE 18 | 0.12 | 1.003 | Eu | 0.01 | 0.005 | 1363 | 231 | ○ | x |

When a dielectric constant of a sample was 1500 or more, the sample was determined as good "○". When an MTTF of a sample was 1000 min or more, the sample was determined as good "○". When a sample satisfied the X5R property, the sample was determined as good "○". When a sample was determined as good in the three judgements, the sample was determined as totally good "○". When a sample was determined as bad "X" in at least one of the three judgements, the sample was determined as totally bad "X".

The examples 1 to 13 were determined as totally good "○". It is thought that this was because a reliable material having a stable structure having the high dielectric constant was obtained because the relationship of "0.02≤the Zr/Ti ratio≤0.10" was satisfied, the relationship of "0.900<the Ba/Ti ratio<1.010" was satisfied, the relationship of "0.005≤the Eu/Ti ratio≤0.05" was satisfied and the relationship "0.0005≤the Mn/Ti ratio≤0.05" was satisfied.

In the comparative example 1, the sufficient lifetime was not achieved. And the X5R property was not achieved. It is thought that this was because the Zr/Ti ratio was 0.01, the core-shell structure was not formed, and a local abnormal grain growth occurred.

The MTTF of the comparative examples 2 to 10 was determined as bad. It is thought that this was because the core-shell in which Zr was diffused into the shell did not achieve the long lifetime because a rare earth element other than Eu was added.

The MTTF of the comparative example 11 was determined as bad. It is thought that this was because the Ba/Ti ratio was 1.010 and the grain growth occurred.

The MTTF of the comparative example 12 was determined as bad. It is thought that this was because the Ba/Ti ratio was 0.900, the amount of Ti was relatively large, and the effect of adding of Zr was small.

The MTTF of the comparative example 13 was determined as bad. It is thought that this was because the Eu/Ti ratio was 0.003 and the effect of adding of Eu was not sufficiently achieved.

In the comparative example 14, the sufficient lifetime was not achieved. It is thought that this was because the Eu/Ti ratio was 0.07, and the amount of Eu was excessively large.

The MTTF of the comparative example 15 was determined as bad. It is thought that this was because the amount of a rare earth element other than Eu was equal to the amount of Eu, and the sufficient lifetime was not achieved.

The MTTF of the comparative example 16 was determined as bad. It is thought that this was because Mn was not added, and sufficient insulation characteristic was not achieved.

The MTTF of the comparative example 17 was determined as bad. It is though that this was because the Mn/Ti ratio was 0.07, and the amount of Mn was excessively large.

The MTTF of the comparative example 18 was determined as bad. It is thought that this was because the Zr/Ti ratio was 0.12, and the grain growth occurred.

From the results of the examples 2 to 7, it is preferable that the Eu/Ti ratio is 0.01 or more and 0.02 or less from a viewpoint of enlarging of the MTTF.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure having a substantially rectangular parallelepiped shape and including dielectric layers and internal electrode layers that are alternately stacked, the dielectric layers being mainly composed of $BaTiO_3$, the internal electrode layers being alternately exposed to two edge faces of the multilayer chip opposite to each other,
   wherein a Zr/Ti ratio that is a ratio of an amount of Zr with respect to an amount of Ti is 0.02 or more and 0.10 or less in a capacity section in which the internal electrode layers next to each other are exposed to different edge faces of the multilayer structure,
   wherein a Ba/Ti ratio that is a ratio of an amount of Ba with respect to the amount of Ti is more than 0.900 and less than 1.010 in the capacity section,
   wherein a Eu/Ti ratio that is a ratio of an amount of Eu with respect to the amount of Ti is 0.005 or more and 0.05 or less in the capacity section,
   wherein a Mn/Ti ratio that is a ratio of an amount of Mn with respect to the amount of Ti is 0.0005 or more and 0.05 or less in the capacity section, and
   wherein a total amount of a rare earth element or rare earth elements is less than the amount of Eu.

2. The multilayer ceramic capacitor as claimed in claim 1, wherein the dielectric layers in the capacity section include no rare earth element other than Eu.

3. The multilayer ceramic capacitor as claimed in claim 1,
   wherein at least one of crystal grains of the dielectric layers in the capacity section has a core-shell structure, and
   wherein, in the core-shell structure, a concentration of Zr in a shell is higher than a concentration of Zr in a core.

4. The multilayer ceramic capacitor as claimed in claim 3,
   wherein the shell includes Zr, and
   wherein the core does not include Zr.

5. The multilayer ceramic capacitor as claimed in claim 3,
   wherein the shell includes Eu, and
   wherein the core does not include Eu.

6. The multilayer ceramic capacitor as claimed in claim 1, wherein the Zr/Ti ratio is 0.03 or more and 0.08 or less.

7. The multilayer ceramic capacitor as claimed in claim 1, wherein the Zr/Ti ratio is 0.04 or more and 0.06 or less.

8. The multilayer ceramic capacitor as claimed in claim 1, wherein the Ba/Ti ratio is 0.950 or more and less than 1.010.

9. The multilayer ceramic capacitor as claimed in claim 1, wherein the Ba/Ti ratio is 1.000 or more and less than 1.010.

10. The multilayer ceramic capacitor as claimed in claim 1, wherein the Eu/Ti ratio is 0.0075 or more and 0.03 or less.

11. The multilayer ceramic capacitor as claimed in claim 1, wherein the Eu/Ti ratio is 0.01 or more and 0.02 or less.

12. The multilayer ceramic capacitor as claimed in claim 1, wherein the Mn/Ti ratio is 0.001 or more and 0.02 or less.

13. The multilayer ceramic capacitor as claimed in claim 1, wherein the Mn/Ti ratio is 0.0015 or more and 0.01 or less.

14. The multilayer ceramic capacitor as claimed in claim 1, wherein the multilayer ceramic capacitor satisfies X5R property.

15. The multilayer ceramic capacitor as claimed in claim 3, wherein a d/D ratio is 0.3 or more and 0.9 or less when a long axis length of a grain diameter is "D" and a long axis length of a core diameter is "d", in the core-shell structure.

16. A dielectric material comprising;
    $BaTiO_3$ powder; and
    an additive compound,
    wherein a Zr/Ti ratio that is a ratio of an amount of Zr with respect to an amount of Ti is 0.02 or more and 0.10 or less, wherein a Ba/Ti ratio that is a ratio of an amount of Ba with respect to the amount of Ti is more than 0.900 and less than 1.010, wherein a Eu/Ti ratio that is a ratio of an amount of Eu with respect to the amount of Ti is 0.005 or more and 0.05 or less, wherein a Mn/Ti ratio that is a ratio of an amount of Mn with respect to the amount of Ti is 0.0005 or more and 0.05 or less, and wherein a total amount of a rare earth element or rare earth elements is less than the amount of Eu.

17. The dielectric material as claimed in claim 16, wherein the Eu/Ti ratio is 0.0075 or more and 0.03 or less.

18. The dielectric material as claimed in claim 16, wherein the Eu/Ti ratio is 0.01 or more and 0.02 or less.

* * * * *